US012613527B2

(12) United States Patent
Lu et al.

(10) Patent No.: US 12,613,527 B2
(45) Date of Patent: Apr. 28, 2026

(54) METHOD FOR MULTI-UNMANNED AERIAL VEHICLE FORMATION TO PASS THROUGH FRAME-SHAPED OBSTACLE

(71) Applicant: GUANGDONG UNIVERSITY OF TECHNOLOGY, Guangzhou (CN)

(72) Inventors: Renquan Lu, Guangzhou (CN); Wei Meng, Guangzhou (CN); Chuangpeng Guo, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 289 days.

(21) Appl. No.: 18/191,893

(22) Filed: Mar. 29, 2023

(65) Prior Publication Data

US 2023/0315126 A1 Oct. 5, 2023

(30) Foreign Application Priority Data

Apr. 2, 2022 (CN) .......................... 202210344428.2

(51) Int. Cl.
*G05D 1/00* (2024.01)
*H04W 64/00* (2009.01)

(52) U.S. Cl.
CPC ............. *G05D 1/104* (2013.01); *G05D 1/102* (2013.01); *G05D 1/106* (2019.05); *H04W 64/006* (2013.01)

(58) Field of Classification Search
CPC ... G01S 2205/03; G01S 5/0284; G05D 1/102; G05D 1/104; G05D 1/106; G05D 1/242;
(Continued)

(56) References Cited

U.S. PATENT DOCUMENTS 8,781,727 B1 7/2014 Bonawitz et al.
9,104,201 B1 8/2015 Pillai et al.
(Continued)

FOREIGN PATENT DOCUMENTS

CN 108958291 A * 12/2018
CN 112114592 A 12/2020
(Continued)

OTHER PUBLICATIONS

Soria, E., Schiano, F., & Floreano, D. (2021). Predictive control of aerial swarms in cluttered environments. Nature Machine Intelligence, 3(6), 545-554. https://doi.org/10.1038/s42256-021-00341-y (Year: 2021).*

(Continued)

*Primary Examiner* — Kito R Robinson
*Assistant Examiner* — Rose Ridder
(74) *Attorney, Agent, or Firm* — Alex Hu

(57) ABSTRACT

A method for a multi-UAV formation to pass through a frame-shaped obstacle, includes: obtaining in real time distance between the frame-shaped obstacle and the UAV formation and displacement of the UAV formation during a flight process; constructing a relative position model between the frame-shaped obstacle and the UAV formation; constructing a UAV velocity control model; constructing a parameter model based on the distance, the displacement, and the relative position model; constructing a position estimation model of the frame-shaped obstacle and a relative position estimation model among the UAVs based on the parameter model; and designing, based on the constructed position estimation model, the relative position estimation model, and the UAV velocity control model, a controller for the UAV formation to pass through the obstacle, and controlling a flight velocity of the UAV formation through the (Continued)

controller to enable the UAV formation to pass through the frame-shaped obstacle.

7 Claims, 5 Drawing Sheets

(58) Field of Classification Search
CPC ...... G05D 1/245; G05D 1/2465; G05D 1/467; G05D 1/622; G05D 1/695; G05D 2109/254; G05D 2111/30; G05D 2111/52; G08G 5/0008; G08G 5/0021; G08G 5/0052; G08G 5/0069; G08G 5/045; H04W 64/006; Y02T 10/40
USPC .......................................................... 701/3
See application file for complete search history.

(56) References Cited

U.S. PATENT DOCUMENTS

| | | | | |
|---|---|---|---|---|
| 10,303,186 | B2 | 5/2019 | Wang | |
| 2018/0074520 | A1* | 3/2018 | Liu .......................... | G08G 5/25 |
| 2021/0034078 | A1* | 2/2021 | Gomez Gutierrez .... | G08G 5/80 |
| 2023/0081963 | A1* | 3/2023 | James .................. | G05D 1/6985 |
| | | | | 701/2 |
| 2023/0104310 | A1* | 4/2023 | Gurdan .................... | G08G 5/80 |
| | | | | 701/3 |

FOREIGN PATENT DOCUMENTS

| | | |
|---|---|---|
| CN | 112987732 A | 6/2021 |
| CN | 113238583 A | 8/2021 |
| CN | 113625762 A | 11/2021 |

OTHER PUBLICATIONS

Falanga, D., Kleber, K., Mintchev, S., Floreano, D., & Scaramuzza, D. (2019). The Foldable Drone: A Morphing Quadrotor That Can Squeeze and Fly. IEEE Robotics and Automation Letters, 4(2), 209-216. https://doi.org/10.1109/LRA.2018.2885575 (Year: 2019).*

Bahiki, M. R., Talib, N. N. A., & Azrad, S. (2016). Relative positioning-based system with tau control for collision avoidance in swarming application. IOP Conference Series. Materials Science and Engineering, 152(1), 12025-. https://doi.org/10.1088/1757-899X/152/1/012025 (Year: 2016).*

Li, S., Ozo, M. M. O. I., De Wagter, C., & de Croon, G. C. H. E. (2020). Autonomous drone race: A computationally efficient vision-based navigation and control strategy. Robotics and Autonomous Systems, 133, 103621-. https://doi.org/10.1016/j.robot.2020.103621 (Year: 2020).*

Chu, J. (2018). Researchers Develop Virtual-Reality Testing Ground For Drones. MIT Product Design & Development. https://news.mit.edu/2018/virtual-reality-testing-ground-drones-0517 (Year: 2018).*

Qamar, S., Khan, S. H., Arshad, M. A., Qamar, M., & Khan, A. (2022). Autonomous Drone Swarm Navigation and Multi-target Tracking in 3D Environments with Dynamic Obstacles. arXiv (Cornell University). https://doi.org/10.48550/arxiv.2202.06253 (Year: 2022).*

* cited by examiner

METHOD FOR MULTI-UNMANNED AERIAL VEHICLE FORMATION TO PASS THROUGH FRAME-SHAPED OBSTACLE

CROSS-REFERENCE TO RELATED APPLICATIONS

This application claims priority to Chinese Patent Application No. 202210344428.2 with a filing date of Apr. 2, 2022. The content of the aforementioned application, including any intervening amendments thereto, is incorporated herein by reference.

TECHNICAL FIELD

The present disclosure relates to the field of unmanned aerial vehicle (UAV) technologies, and specifically, to a method for a multi-UAV formation to pass through a frame-shaped obstacle, which is applicable to rescue, firefighting, detection and other scenarios that require UAVs to collaboratively work during passing through obstacles.

BACKGROUND

In the last decade, UAVs have been widely used in civil, industrial and military applications. Cooperation among multiple UAVs during executing tasks such as passing through, rescue and resupply has been a research hotspot. Multiple UAVs form a UAV cluster and realize information exchange and sharing through aerial networking. The UAV cluster is capable of executing collaborative tasks through flight control, intelligent learning and other technologies, which give full play to the advantages of each UAV, so as to meet complex task requirements. Compared with a single UAV, the multi-UAV cluster has higher robustness, redundancy, scalability and efficiency when executing tasks, and the viability of the UAVs is also enhanced. When a node in the cluster fails or is attacked offline, the task undertaken by this node will be replaced by another node, which ensures the completion of tasks.

Regarding the cooperation among UAVs, it is the research emphasis on how the multi-UAV formation passes through obstacles. In order to realize the cooperation among UAVs, each UAV needs to obtain relative positions of neighboring UAVs which are usually obtained by external positioning systems such as the Global Position System (GPS) or the Global Navigation Satellite System (GNSS). When executing the pass-through task, the UAV usually carries a visual odometer to identify and calculate the center of the frame-shaped obstacle. However, it is difficult for the visual odometer to function since the UAVs usually work in some scenarios where the GPS or GNSS signals are weak, especially with dim light, low visibility, and occlusion.

In the prior art, there are the following solutions for the UAV formation collaboratively passing through the frame-shaped obstacle:

If the GPS is available, positioning modules such as GPS modules are installed on the UAVs and the obstacle, to obtain the positions of the UAVs and the obstacle, and the formation passes through the obstacle through position control. Alternatively, if indoor positioning based on Ultra Wide Band (UWB) base stations is available, the positions of the UAVs and the obstacle can also be obtained.

If monocular, binocular or infrared cameras (RGB-D) are available, map construction and positioning are performed through the simultaneous localization and mapping (SLAM) algorithm, and the obstacle is recognized based on feature points. The UAV formation may share positions through transmission protocols such as Bluetooth or WIFI. This solution has high requirements on hardware and involves more complex computation.

If both the GPS and the cameras are available, positioning modules such as GPS modules are installed on the UAVs to obtain positions, while monocular or binocular cameras are installed on the UAVs to identify the obstacle, which enables the formation to pass through the obstacle.

Without exception, all of the above solutions require at least one GPS or camera for the formation to pass through the obstacle, and they usually fail in some unknown environments where the GPS is limited and cameras are limited due to dim light.

SUMMARY OF PRESENT INVENTION

The purpose of the present disclosure is to provide a method for a multi-UAV formation to pass through a frame-shaped obstacle, which uses only the on-board sensor of the UAV and the UWB distance sensor. This method has the advantages of strong adaptability and no dependence on the light and GPS.

To achieve the above objective, the following technical solutions are provided:

A method for a multi-UAV formation to pass through a frame-shaped obstacle includes:

obtaining in real time distance between the frame-shaped obstacle and the UAV formation and displacement of the UAV formation during a flight process;

constructing a relative position model between the frame-shaped obstacle and the UAV formation;

constructing a UAV velocity control model;

constructing a parameter model based on the distance, the displacement, and the relative position model;

constructing a position estimation model of the frame-shaped obstacle and a relative position estimation model among UAVs in the UAV formation based on the parameter model; and designing, based on the position estimation model, the relative position estimation model, and the UAV velocity control model, a controller for the UAV formation to pass through the obstacle, and controlling a flight velocity of the UAV formation through the controller to enable the UAV formation to pass through the frame-shaped obstacle.

Further, the relative position model between the frame-shaped obstacle and the UAV formation is constructed by using the following formula:

$$\begin{cases} q_0(k) = p_0(k) - p_s \\ q_{j0}(k) = p_j(k) - p_0(k) \end{cases} \tag{1.1}$$

where $p_0(k)$ and $p_j(k)$ respectively represent positions of a primary UAV and a UAV j in a global coordinate system at a moment k, $p_s$ represents a position of the frame-shaped obstacle in the global coordinate system, $q_0(k)$ represents a relative position between a primary UAV and the frame-shaped obstacle, and $q_{j0}(k)$ represents a relative position between the UAV j and the primary UAV.

Further, the constructing the UAV velocity control model may include:

modeling each of the UAVs as a discrete-time integrator with bounded velocities by using the following formula:

$$\begin{cases} p_0(k+1) = p_0(k) + \bar{v}_0(k)T, \; \|\bar{v}_0(k)\| \le V_0 \\ p_j(k+1) = p_j(k) + \bar{v}_j(k)T, \; \|\bar{v}_j(k)\| \le V_j \end{cases} \qquad (1.2)$$

where T is a sampling period, $\bar{v}_0(k)$ and $\bar{v}_j(k)$ are velocity bounds to the primary UAV and the UAV j respectively, $V_0$ and $V_j$ are maximum velocities of the primary UAV and the UAV j respectively, and $V_j > V_0$.

Further, the constructing the parameter model based on the distance, the displacement, and the relative position model may include:

expressing the distance and the displacement obtained in real time by relative positions among the UAVs as follows:

$$d_0(k) = \|q_0(k)\|, d_{j0}(k) = \|q_{j0}(k)\| \qquad (1.3)$$

$$\varphi_0(k) = q_0(k+1) - q_0(k)$$

$$\varphi_{j0}(k) = q_{j0}(k+1) - q_0(k) = \varphi_j(k) - \varphi_0(k) \qquad (1.4)$$

constructing the parameter model based on the formulas (1.3) and (1.4):

$$\begin{cases} \grave{O}_s(k) = \varphi_0(k)^T p_0(k) - \frac{1}{2}\left(d_0^2(k) - d_0^2(k-1) + \|\varphi_0(k)\|^2\right) \\ \qquad = \varphi_0(k)^T\left(p_0(0) + \sum_{i=1}^{k}\varphi_0(i)\right) - \frac{1}{2}\left(d_0^2(k) - d_0^2(k-1) + \|\varphi_0(k)\|^2\right) = \varphi_0(k)^T p_s(k) \\ \grave{O}_{j0}(k) = \frac{1}{2}\left(d_{j0}^2(k) - d_{j0}^2(k-1) + \|\varphi_{j0}(k)\|^2\right) \\ \qquad = \varphi_{j0}(k)^T q_{j0}(k) \end{cases} \qquad (1.5)$$

where $p_0(0)$ represents a position of the primary UAV at an initial moment, $d_0(k)$ represents a distance between the primary UAV and the frame-shaped obstacle, $d_{j0}(k)$ represents a distance between the primary UAV and the a UAV j, $\varphi_0(k)$ represents a displacement of the primary UAV, $\varphi_j(k)$ represents a displacement of the UAV j, $\varphi_{j0}(k)$ represents a relative displacement between the primary UAV and the UAV j, as $\grave{o}_s(k)$ is a constructed parameter model related to the position $p_s(k)$ of the frame-shaped obstacle, $\grave{o}_{j0}(k)$ is a constructed parameter model related to the relative position $q_{j0}(k)$ between the UAV j and the primary UAV, and the superscript T represents transposition.

Further, the constructing a position estimation model of the frame-shaped obstacle may specifically include:

$$\begin{cases} R_0(k+1) = \left(\mu I + \Phi_0(k)M(k)\Phi_0(k)^T\right)^{-1} \\ \qquad = \left(\lambda R_0(k)^{-1} + \mu(1-\lambda)I + \varphi_0(k)\varphi_0(k)^T\right)^{-1} \\ \qquad = \frac{1}{\lambda}\left(I - \frac{\chi_0(k)\varphi_0(k)\varphi_0(k)^T}{\varphi_0(k)^T\chi_0(k)\varphi_0(k) + \lambda}\right)\chi_0(k) \\ \chi_0(k) = \left(R_0(k)^{-1} + \frac{(1-\lambda)\mu I}{\lambda}\right)^{-1} \\ \hat{p}_s(k+1) = \hat{p}_s(k) + \lambda\mu R_0(k+1)(\hat{p}_s(k) - \hat{p}_s(k-1)) + \\ \qquad R_0(k+1)\varphi_0(k)\left(\grave{O}_s(k) - \varphi_0(k)^T\hat{p}_s(k)\right) \end{cases} \qquad (1.6)$$

where I is a unit matrix, $R_0(k)$ is a covariance matrix at the moment k, $\hat{p}_s(k)$ is an estimation value of the position $p_s(k)$, $\lambda$ is a forgetting factor, $\mu$ is a damping term, and $\Phi_0(k)$ is a set matrix of $\varphi_0(k)$ and satisfies:

$$\sum_{i=k+1}^{k+N} \varphi_0(i)\varphi_0(i)^T \ge \delta_1 I > 0,$$

$\delta_1$ is a minimum eigenvalue of the set matrix, N represents a dimensionality of the method, and M (k) is a forgetting operator matrix of $\lambda$ and satisfies:

$$M(k) = \begin{bmatrix} \lambda M(k-1) & 0 \\ 0 & 1 \end{bmatrix}.$$

Further, the relative position estimation model among the UAVs is expressed as follows:

$$\begin{cases} R_{j0}(k+1) = \left(\Phi_{j0}(k)M(k)\Phi_{j0}(k)^T\right)^{-1} \\ \qquad = \left(\lambda R_{j0}(k)^{-1} + \varphi_{j0}(k)\varphi_{j0}(k)^T\right)^{-1} \\ \qquad = \frac{1}{\lambda}\left(I - \frac{R_{j0}(k)\varphi_{j0}(k)\varphi_{j0}(k)^T}{\varphi_{j0}(k)^T R_{j0}(k)\varphi_{j0}(k) + \lambda}\right)R_{j0}(k) \\ \hat{q}_{j0}(k+1) = \hat{q}_{j0}(k) + \varphi_{j0}(k) + \\ \qquad R_{j0}(k)\varphi_{j0}(k)\left(\grave{O}_{j0}(k) - \varphi_{j0}(k)^T\hat{q}_{j0}(k)\right) \end{cases} \qquad (1.7)$$

where $\Phi_{j0}(k)$ is a set matrix of $\varphi_{j0}(k)$, $R_{j0}(k)$ is a covariance matrix, and $\hat{q}_{j0}(k)$ is an estimated position of the UAV j relative to the primary UAV.

Further, the controller for the UAV formation to pass through the obstacle may be designed as follows:

$$\begin{cases} v_0(k) = A_0\left(H_0(k) - p_0(k) - \sum_{i=0}^{k-1}\varphi_0(i) + \hat{p}_s(k) + \varsigma(k)\right) \\ \bar{v}_0(k) = \frac{\min(V_0, \|v_0(k)\|)}{\|v_0(k)\|}v_0(k), \; V_0 > 0 \\ v_j(k) = A_j\left(H_{j0}(k) - \hat{q}_{j0}(k)\right) \\ \bar{v}_j(k) = \frac{\min(V_j, \|v_j(k)\|)}{\|v_j(k)\|}v_j(k), \; V_j > V_0 > 0 \end{cases} \qquad (1.8)$$

where $\varphi_0(i)$ represents a displacement of the primary UAV at a moment i, $\hat{p}_s(k)$ is an estimation value of the position $p_s(k)$ of the frame-shaped obstacle at the moment k, $v_0(k)$ and $v_j(k)$ are velocities of the primary UAV and the UAV j obtained by event-triggering the controller for the formation to pass through the obstacle, $\bar{v}_0(k)$ and $\bar{v}_j(k)$ are obtained by limiting $v_0(k)$ and $v_j(k)$ to enable final output velocities to be less than preset maximum velocities $V_0$ and $V_j$, $A_0$ and A; are designed controller coefficients, and $\zeta(k)$ is a continuous excitation signal; and $H_0(k)$ and $H_{j0}(k)$ each is a switching function that is a segmented constant function, and $H_0(k)$ and $H_{j0}(k)$ represent a signals switching between displaying formation and passing through the obstacle.

Further, $H_0(k)$ and $H_{j0}(k)$ are specifically expressed as follows:

$$H_0(k) = \begin{cases} q_0^s & k \in [k_1, k_2] \\ Rot * (\hat{q}_0(k) + \alpha) & k \in (k_2, k_3) \\ q_0^e & k \in [k_3, k_4] \end{cases} \qquad (1.9)$$

$$H_{j0}(k) = \begin{cases} Rot * q_{j0}^{pass} & k \in (k_2, k_3) \\ q_{j0}^{init} & k \in [k_1, k_2] \cup [k_3, k_3] \end{cases}$$

where $k_1$ is an initial time, $k_4$ is an operation time, $k_2=\sup\{k>k_1|\hat{q}_0(k)<q_0{}^s\}$ $k_3=\sup\{k>k_3|\hat{q}_0(k)>q_0{}^e\}$, $\hat{q}_0(k)$ represents an estimation value of a position of the primary UAV at the moment k, sup represents an upper bound, $q_0{}^s$ and $q_0{}^e$ are start and end points artificially set for an event trigger respectively, Rot is a rotation matrix of the frame-shaped obstacle relative to a coordinate system; in a two-dimensional case, the rotation matrix is:

$$Rot = \begin{pmatrix} \cos(w) & -\sin(w) \\ \sin(w) & \cos(w) \end{pmatrix},$$

w is an angle of the obstacle relative to the UAV in the coordinate system; $\alpha$ is a pass-through step during passing through the obstacle;

$$q_{j0}^{init}$$

is a formation of the UAVs before and after passing through the obstacle, and $$q_{j0}^{pass}$$

is a formation of the UAVs during passing through the obstacle.

A computer device is provided, including a memory, a processor, and a computer program stored in the memory and executable on the processor, and the processor executes the computer program to perform the steps of the method described above.

A computer-readable storage medium is provided. The computer-readable storage medium stores a computer program, and the steps of the method described above are performed when the computer program is executed by a processor.

Compared with the prior art, technical solutions provided in the present disclosure have the following advantages:

1. In the present disclosure, there is neither dependence on the GPS to obtain accurate global position information, nor dependence on the cameras to obtain the visual information. The multi-UAV formation passes through the frame-shaped obstacle using the distance and displacement data obtained by the UWB sensor and the Inertia Measurement Unit (IMU) sensor. The method provided in the present disclosure is applicable to numerous special scenarios since the UWB sensor and the IMU sensor have strong anti-interference ability in long distance scenarios, and are hardly influenced by the environment. Further, in some cases, the UWB sensor and the IMU sensor can be used for precise positioning, and precise calculation of the relative distances between the UAVs which further ensures coverage search of the UAV formation in special environments, especially in GPS-constrained situations.

2. In the present disclosure, the computation complexity is very low. Compared with positioning and navigation through the existing simultaneous localization and mapping (SLAM) technology, the computation volume in the technical solutions of the present disclosure is very low and the required data can be processed very fast with high precision but low requirements on hardware environment. Therefore, the present disclosure requires lower computation volume and simpler hardware configuration, which can greatly reduce the costs.

3. The present disclosure innovatively connects and integrates the relative fixed formation and obstacle pass-through, to propose a new solution in this field.

DETAILED DESCRIPTION OF THE EMBODIMENTS

Figure 1:
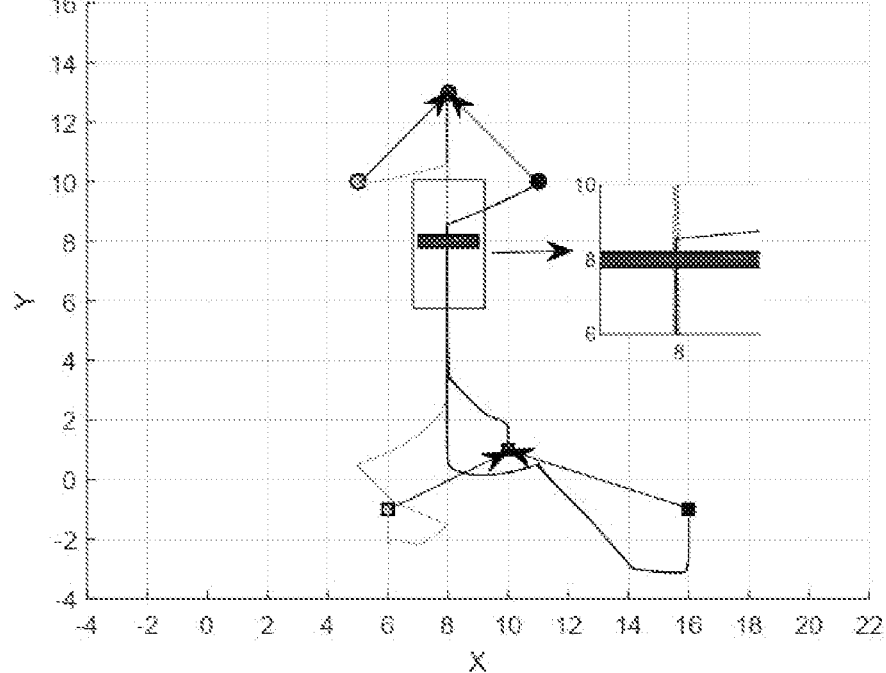
FIG. 1 is a two-dimensional view of the simulation effect of the method in MATLAB according to the present disclosure.

In the prior at, the GPS is needed to obtain global absolute positions of UAVs and relative positions among the UAVS for the UAV formation to pass through the obstacle. The data volume is very large and hence the processing speed is slowed down. In addition, good light environment is necessary for passing through the obstacle. In view of this, the present disclosure proposes a method for a multi-UAV formation to pass through a frame-shaped obstacle, in which the GPS is not needed, and the method hence has strong environment applicability.

The method for the multi-UAV formation to pass through the frame-shaped obstacle, includes the following steps.

Step 1: Obtain in real time a distance between the frame-shaped obstacle and the UAV formation and a displacement of the UAV formation during flight.

The distance $d_0$ between the frame-shaped obstacle and the UAV formation and the distance $d_{j0}$ between a UAV j and a primary UAV 0 are obtained.

In addition, the UAVs obtain velocity information in real time and perform integration processing to obtain the displacement $\varphi_0$ and $\varphi_j$. $\varphi_0$ represents a displacement of the primary UAV (leader) in the formation, $\varphi_j$ represents a displacement of the UAV j (follower) in the formation, and j represents the serial number of the UAV.

Step 2: Construct a relative position model between the frame-shaped obstacle and the UAV formation by using the following formula:

$$\begin{cases} q_0(k) = p_0(k) - p_s \\ q_{j0}(k) = p_j(k) - p_0(k) \end{cases} \tag{1.1}$$

$p_0(k)$ and $p_j(k)$ respectively represent positions of the primary UAV and the UAV j in a global coordinate system at a moment k, $p_s$ represents a position of the frame-shaped obstacle in the global coordinate system, $q_0(k)$ represents a relative position between the primary UAV and the frame-shaped obstacle, and $q_{j0}(k)$ represents a relative position between the UAV j and the primary UAV.

Step 3: Construct a UAV velocity control model, including:

modeling each of the UAVs as a discrete-time integrator with bounded velocities by using the following formula:

$$\begin{cases} p_0(k+1) = p_0(k) + \bar{v}_0(k)T, \ \|\bar{v}_0(k)\| \le V_0 \\ p_j(k+1) = p_j(k) + \bar{v}_j(k)T, \ \|\bar{v}_j(k)\| \le V_j \end{cases} \quad (1.2)$$

where T is a sampling period, $\bar{v}_0(k)$ and $\bar{v}_j(k)$ are velocity bounds to the primary UAV and the UAV j respectively, $V_0$ and $V_j$ are maximum velocities of the primary UAV and the UAV j respectively, and $V_j > V_0$. k and k+1 represent moments k and k+1, similarly hereinafter. Details are not repeated again.

Step 4: Construct a parameter model based on the distance, the displacement obtained in the step 1, and the relative position model obtained in the step 2. Details are as follows.

The distance and the displacement obtained in real time are expressed by relative positions among the UAVs as follows:

$$d_0(k) = \|q_0(k)\|, d_{j0}(k) = \|q_{j0}(k)\| \quad (1.3)$$

$$\varphi_0(k) = q_0(k+1) - q_0(k) \quad (20)$$

$$\varphi_{j0}(k) = q_{j0}(k+1) - q_{j0}(k) = \varphi_j(k) - \varphi_0(k) \quad (1.4)$$

Then, the parameter model is constructed based on the formulas (1.3) and (1.4):

$$\begin{cases} \grave{O}_s(k) = \varphi_0(k)^T p_0(k) - \frac{1}{2}\left(d_0^2(k) - d_0^2(k-1) + \|\varphi_0(k)\|^2\right) \quad (1.5) \\ \qquad = \varphi_0(k)^T\left(p_0(0) + \sum_{i=1}^{k}\varphi_0(i)\right) - \frac{1}{2}\left(d_0^2(k) - d_0^2(k-1) + \right. \\ \qquad \left. \|\varphi_0(k)\|^2\right) = \varphi_0(k)^T p_s(k) \\ \grave{O}_{j0}(k) = \frac{1}{2}\left(d_{j0}^2(k) - d_{j0}^2(k-1) + \|\varphi_{j0}(k)\|^2\right) \\ \qquad = \varphi_{j0}(k)^T q_{j0}(k) \end{cases}$$

In the formula (1.5), $p_0(0)$ represents a position of the primary UAV at an initial moment, $\grave{o}_s(k)$ is a constructed parameter model related to the position $p_s(k)$ of the frame-shaped obstacle, $\grave{o}_{j0}(k)$ is a constructed parameter model related to a relative position $q_{j0}(k)$ between the UAV j and the primary UAV, and the superscript T represents transposition.

Step 5: Construct a position estimation model of the frame-shaped obstacle and a relative position estimation model among the UAVs based on the parameter model in the step 4, including the following derivations:

Step 5.1: Construct the position estimation model of the frame-shaped obstacle.

According to formula (1.5), a forgetting factor $\lambda$ is added in this scheme to prevent new data from being overwhelmed by old data. In addition, a damping term $\mu$ is designed in this scheme to increase the stability of the algorithm in order to prevent unexpected cases during recognition of $\hat{p}_s(k)$.

$$\begin{cases} R_0(k+1) = \left(\mu I + \Phi_0(k)M(k)\Phi_0(k)^T\right)^{-1} \quad (1.6) \\ \qquad = \left(\lambda R_0(k)^{-1} + \mu(1-\lambda)I + \varphi_0(k)\varphi_0(k)^T\right)^{-1} \\ \qquad = \frac{1}{\lambda}\left(I - \frac{\chi_0(k)\varphi_0(k)\varphi_0(k)^T}{\varphi_0(k)^T\chi_0(k)\varphi_0(k) + \lambda}\right)\chi_0(k) \\ \chi_0(k) = \left(R_0(k)^{-1} + \frac{(1-\lambda)\mu I}{\lambda}\right)^{-1} \\ \hat{p}_s(k+1) = \hat{p}_s(k) + \lambda\mu R_0(k+1)(\hat{p}_s(k) - \hat{p}_s(k-1)) + \\ \qquad R_0(k+1)\varphi_0(k)\left(\grave{O}_s(k) - \varphi_0(k)^T\hat{p}_s(k)\right) \end{cases}$$

I is a unit matrix, $R_0(k)$ is a covariance matrix at the moment k, $\hat{p}_s(k)$ is an estimation value of the position $p_s(k)$ of the frame-shaped obstacle at a moment k. In this scheme, the parameter marked with A represents an estimation of the parameter, similarly hereinafter. $\Phi_0(k)$ is a set matrix of $\varphi_0(k)$ and satisfies:

$$\sum_{i=k+1}^{k+N}\varphi_0(i)\varphi_0(i)^T \ge \delta_1 I > 0,$$

$\delta_1$ is a minimum eigenvalue of the set matrix, and N represents a dimension of the method. N is 2 if the position is estimated in the two-dimensional case, and N is 3 if the position is estimated in the three-dimensional case. M(k) is a forgetting operator matrix of $\lambda$, and satisfies:

$$M(k) = \text{diag}(\lambda^{k-1} \ \lambda^{k-2} \ \dots \ \lambda^0) = \begin{bmatrix} \lambda M(k-1) & 0 \\ 0 & 1 \end{bmatrix}.$$

Therefore, when $0 < \lambda \le 1$, $\mu^2 \le \delta_1{}^2\lambda^{2N\times3}$, the primary UAV can accurately estimate the position of the frame-shaped obstacle by using the formula (1.6).

Step 5.2: Construct the relative position estimation model among the UAVs, including the following derivations:

The following relative position estimator is designed for the UAV j:

$$\begin{cases} R_{j0}(k+1) = \left(\Phi_{j0}(k)M(k)\Phi_{j0}(k)^T\right)^{-1} \quad (1.7) \\ \qquad = \left(\lambda R_{j0}(k)^{-1} + \varphi_{j0}(k)\varphi_{j0}(k)^T\right)^{-1} \\ \qquad = \frac{1}{\lambda}\left(I - \frac{R_{j0}(k)\varphi_{j0}(k)\varphi_{j0}(k)^T}{\varphi_{j0}(k)^T R_{j0}(k)\varphi_{j0}(k) + \lambda}\right)R_{j0}(k) \\ \hat{q}_{j0}(k+1) = \hat{q}_{j0}(k) + \varphi_{j0}(k) + \\ \qquad R_{j0}(k)\varphi_{j0}(k)\left(\grave{O}_{j0}(k) - \varphi_{j0}(k)^T\hat{q}_{j0}(k)\right) \end{cases}$$

$\Phi_{j0}(k)$ is a set matrix of $\varphi_{j0}(k)$, $R_{j0}(k)$ is a covariance matrix, and $\hat{q}_{j0}(k)$ is an estimated position of the UAV j relative to the primary UAV. When $0 < \lambda \le 1$, the relative position between the UAV j and the primary UAV can be accurately estimated by using the formula (1.7).

Step 6: Design, based on the position estimation model (1.6) and the relative position estimation model (1.7) constructed in the step 5, and the UAV velocity control model in the step 3, a controller for the UAV formation to pass through the obstacle, and control a flight velocity of the UAV formation through the controller to enable the UAV formation to pass through the frame-shaped obstacle.

The controller for the UAV formation to pass through the obstacle may be specifically designed as follows:

An event is designed as follows based on the formulas (1.6) and (1.7) and the UAV velocity control model (1.2) to trigger the controller for the formation to pass through.

$$\begin{cases} v_0(k) = A_0\left(H_0(k) - p_0(0) - \sum_{i=0}^{k-1}\varphi_0(i) + \hat{p}_s(k) + \varsigma(k)\right), \quad (1.8) \\ \bar{v}_0(k) = \frac{\min(V_0, \|v_0(k)\|)}{\|v_0(k)\|}v_0(k), \ V_0 > 0 \\ v_j(k) = A_j\left(H_{j0}(k) - \hat{q}_{j0}(k)\right) \\ \bar{v}_j(k) = \frac{\min(V_j, \|v_j(k)\|)}{\|v_j(k)\|}v_j(k), \ V_j > V_0 > 0 \end{cases}$$

$\hat{p}_s(k)$ is an estimation of the position $p_s(k)$ of the frame-shaped obstacle at the moment k, $v_0(k)$ and $v_j(k)$ are velocities of the primary UAV and the UAV j obtained by event-triggering the controller for the formation to pass through the obstacle, and $\bar{v}_0(k)$ and $\bar{v}_j(k)$ are obtained by limiting $v_0(k)$ and $\bar{v}_j(k)$ to enable final output velocities to be less than preset maximum velocities $V_0$ and $V_j$. Designing is based on the UAV control model in the formula (1.2). $A_0$ and $A_j$ are designed controller coefficients, the range of which is defined by the formula (1.10). $\zeta(k)$ is a continuous excitation signal, which is used to avoid a singular solution.

$H_0(k)$ and $H_{j0}(k)$ each are a switching function that is a segmented constant function, which represents a switching signal between displaying formation and passing through the obstacle. The details are as follows:

$$H_0(k) = \begin{cases} q_0^s & k \in [k_1, \ k_2] \\ Rot^*(\hat{q}_0(k) + \alpha) & k \in (k_2, \ k_3) \\ q_0^e & k \in [k_3, \ k_4] \end{cases} \qquad (1.9)$$

$$H_{j0}(k) = \begin{cases} Rot^* q_{j0}^{pass} & k \in (k_2, \ k_3) \\ q_{j0}^{init} & k \in [k_1, \ k_2] \cup [k_3, \ k_4] \end{cases}$$

$k_1$ is an initial time, $k_4$ is an operation time, $k_2=\sup\{k>k_1|\hat{q}_0(k)<q_0^s\}$, $k_3=\sup\{k>k_3|\hat{q}_0(k)>q_0^e\}$, $\hat{q}_0(k)$ represents an estimation of the position of the primary UAV at the moment k, and sup represents an upper bound.

$$q_0^s \text{ and } q_0^e$$

are start and end points artificially set for the event trigger, expressing that formation pass-through starts when the relative position between the primary UAV and the frame-shaped obstacle reaches $$q_0^s,$$

and ends when the relative position reaches $$q_0^e.$$

Rot is a rotation matrix of the frame-shaped obstacle relative to the coordinate system. In a two-dimensional case, the rotation matrix is:

$$Rot = \begin{pmatrix} \cos(w) & -\sin(w) \\ \sin(w) & \cos(w) \end{pmatrix}.$$

w is an angle of the obstacle relative to the UAV in the coordinate system, and the angle may be artificially specified, or be measured by the odometer on the UWB sensor. $\alpha$ is a pass-through step during passing through the obstacle.

$$q_{j0}^{init}$$

is a formation of the UAVs before and after passing through the obstacle, and $$q_{j0}^{pass}$$

is a formation of the UAVs during passing through the obstacle.

It should be noted that the formation pass-through error is exponentially convergent when the controller (1.8) and (1.9) for the UAV formation to pass through the obstacle satisfies the following conditions:

$$0 < -(1 - A_0 Ts_0(k))^2 + \frac{4}{3} < 1 \qquad (1.10)$$

$$0 < -(1 - A_j Ts_j(k))^2 + \frac{3}{2} < 1$$

T represents a sampling time, $$s_0(k) = \frac{\min(V_0, \|v_0(k)\|)}{\|v_0(k)\|} < 1,$$

and $$s_j(k) = \frac{\min(V_j, \|v_J(k)\|)}{\|v_j(k)\|} < 1.$$

When the method of the present disclosure is applied in practice, firstly, the distance $d_0$ and $d_{j0}$ and the displacement $\varphi_0$ and $\varphi_j$ that are acquired in the step 1 are substituted into the parameter model in the step 4 for solving, to obtain $\grave{o}_s(k)$ and $\grave{o}_{j0}(k)$, which are then substituted into the position estimation model of the obstacle and the relative position estimation model among the UAVs in the step 5, to obtain $\hat{p}_s(k)$ and $\hat{q}^{j0}(k)$. Further, $\hat{p}_s(k)$ and $\hat{q}_{j0}(k)$ are substituted into the controller for the UAV formation to pass through the obstacle in the step 6, and the UAV formation is controlled to fly according to the preset formula (1.9). In addition, the vector velocity of the UAV formation at each moment is calculated by using the formula (1.8), and the UAV formation passes through the frame-shaped obstacle through speed control. This can solve the formation problem in the limited GPS environment and the pass-through problem in the limited light environment.

Simulation Experiments

Figure 2:
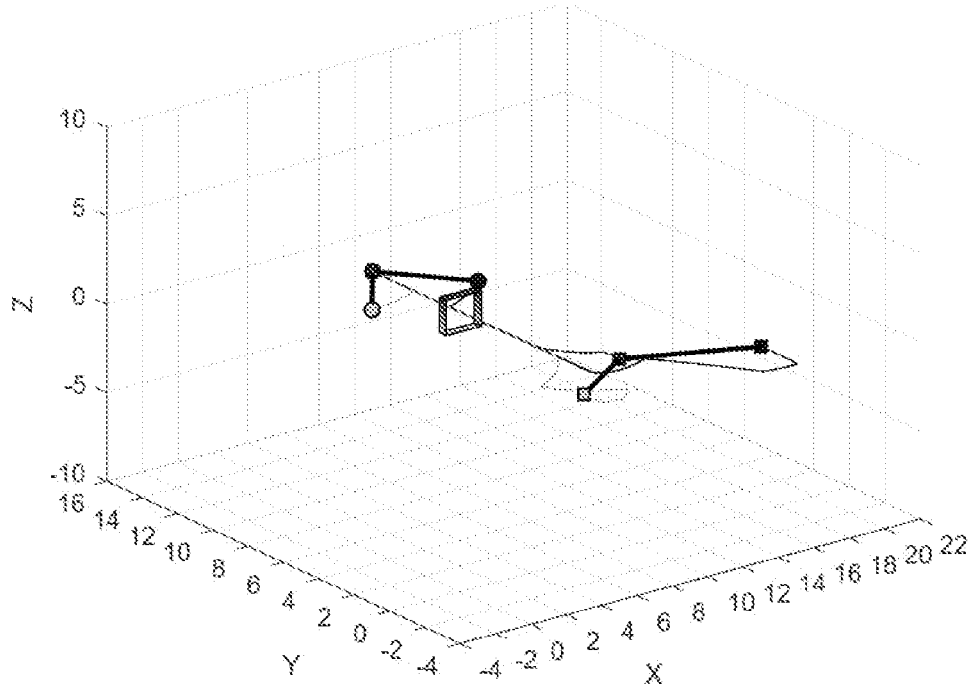
FIG. 2 is a three-dimensional view of the simulation effect of the method in MATLAB according to the present disclosure.

The simulation effect of the method according to the present disclosure in MATLAB is shown in FIG. 1 and FIG. 2. The distance and displacement required for the algorithms is obtained by mathematical operations on coordinates. It should be noted that the distance is 2-Norm of a difference between two coordinates, and the displacement is the difference between two coordinates. The global coordinate values are not used in the numerical verification of the algorithms.

Figure 3:
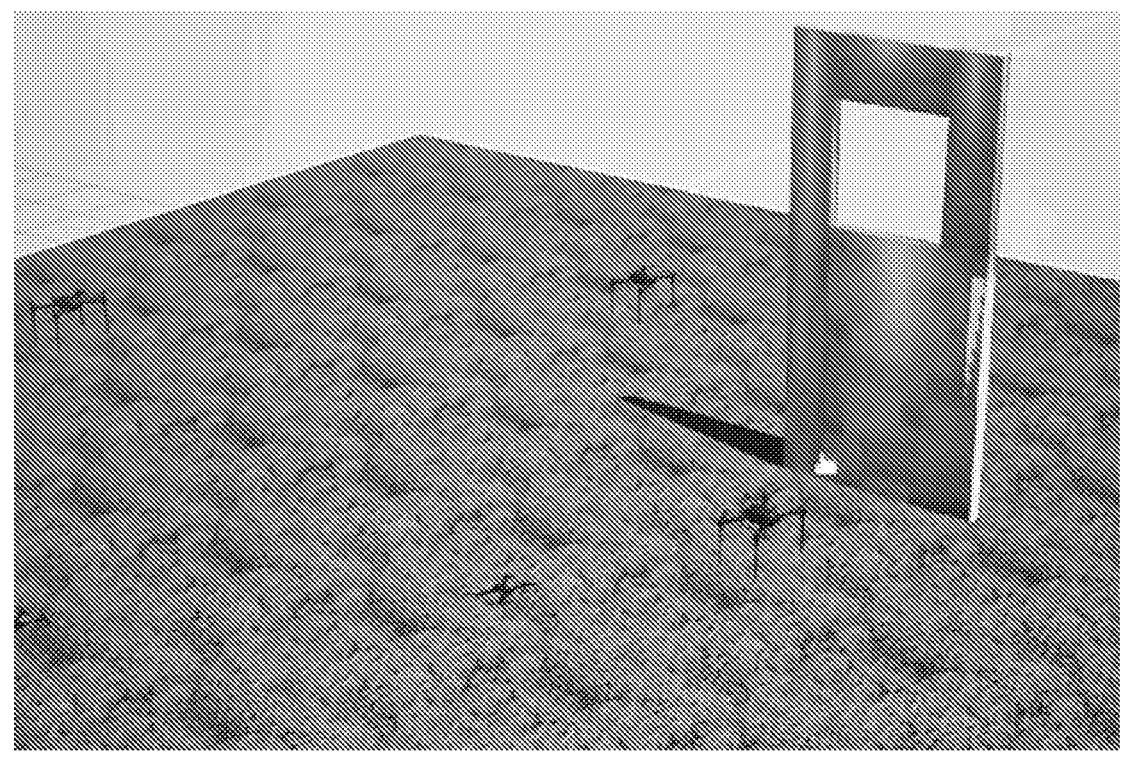
FIG. 3 to FIG. 5 are schematic diagrams of simulation effects at different positions in gazebo according to the present disclosure.
Figure 4:
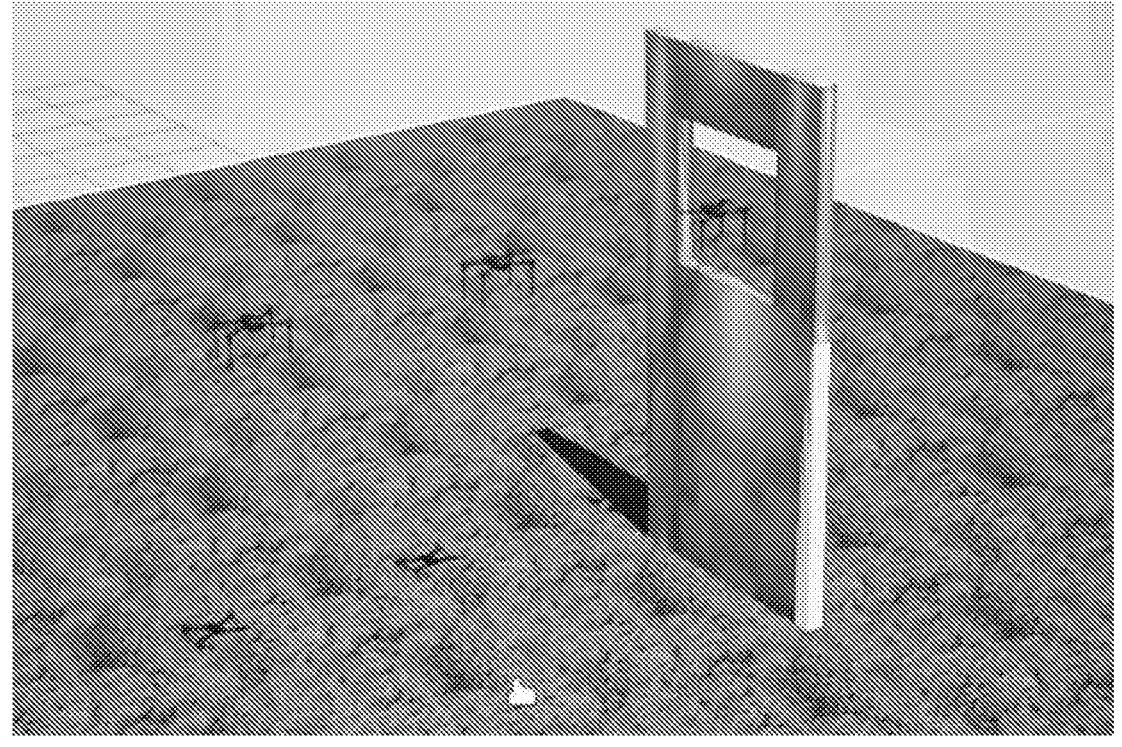
Figure 5:
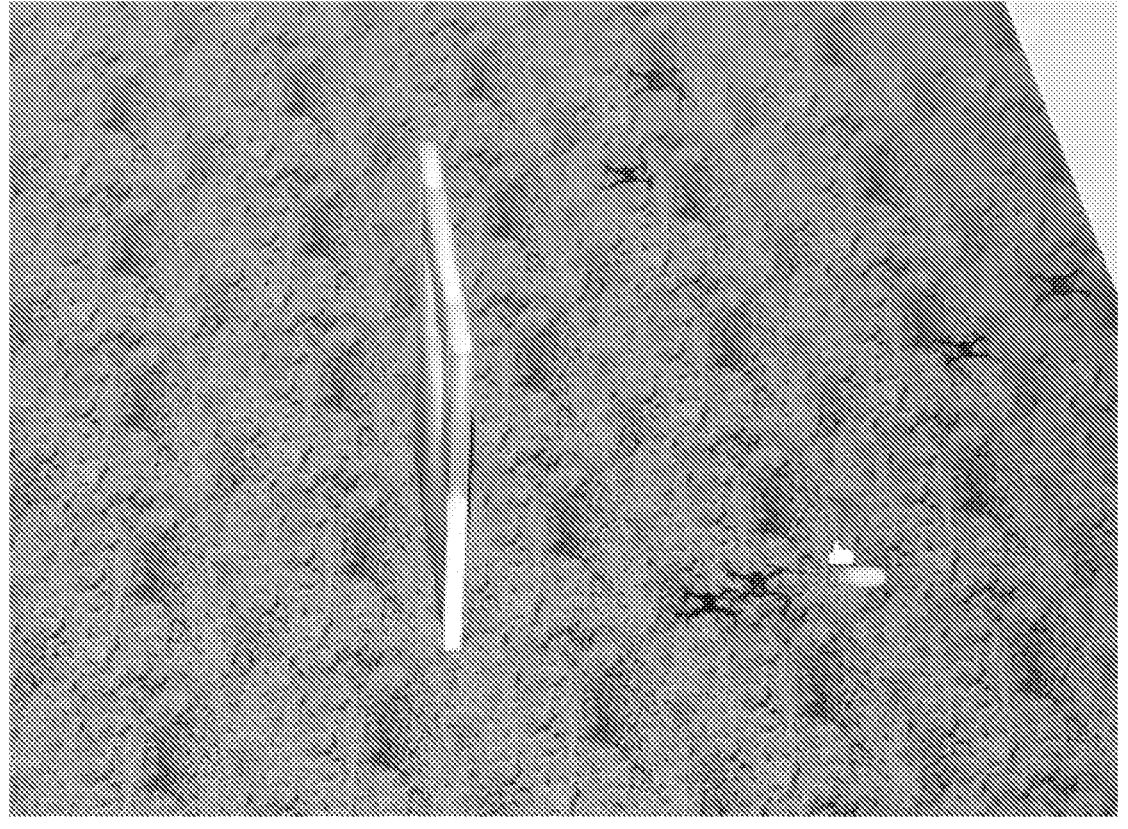

Further, the method of the present disclosure is applied to GAZEBO software for verification, which depends on the powerful UAV dynamics model of GAZEBO. This aims to ensure that the mathematical model designed in the algorithms can be applied in a real UAV model. The simulation effects in GAZEBO are shown in FIG. 3 to FIG. 5.

It can be learned that the multiple UAVs, as envisioned, maintain a formation before passing through, then change the formation to meet the requirements for passing through the frame-shaped obstacle, and resume the original formation afterwards. This verifies the reasonableness of this method in the real UAV model.

It should be noted that the above embodiments are merely intended to explain the technical solutions of the present application, rather than to limit the present application. Although the present application is described in detail with reference to the above embodiments, those of ordinary skill in the art should understand that they can still modify the technical solutions described in the above embodiments or make equivalent substitutions on some technical features therein without departing from the spirit of the technical solutions. However, these modifications or substitutions should fall within the protection scope of the present application.

What is claimed is:

1. A method for a multi-unmanned aerial vehicle (UAV) formation to pass through a frame-shaped obstacle, comprising:

obtaining in real time a distance between the frame-shaped obstacle and the UAV formation and a displacement of the UAV formation during a flight process;

constructing a relative position model between the frame-shaped obstacle and the UAV formation;

constructing a UAV velocity control model;

constructing a parameter model based on the distance, the displacement, and the relative position model;

constructing a position estimation model of the frame-shaped obstacle and a relative position estimation model among UAVs in the UAV formation based on the parameter model; and designing, based on the position estimation model, the relative position estimation model, and the UAV veloc- 2. The method according to claim 1, wherein the relative position model between the frame-shaped obstacle and the UAV formation is constructed by using the following formula:

$$\begin{cases} q_0(k) = p_0(k) - p_s \\ q_{j0}(k) = p_j(k) - p_0(k) \end{cases} \tag{1.1}$$

wherein $P_0(k)$ and $P_j(k)$ respectively represent positions of a primary UAV and a UAV j in a global coordinate system at a moment k, $P_s$ represents a position of the frame-shaped obstacle in the global coordinate system, $q_0(k)$ represents a relative position between the primary UAV and the frame-shaped obstacle, and $q_{j0}(k)$ represents a relative position between the UAV j and the primary UAV.

3. The method according to claim 1, wherein the constructing the parameter model based on the distance, the displacement, and the relative position model comprises:

expressing the distance and the displacement obtained in real time by relative positions among the UAVs as follows:

$$d_0(k) = \|q_0(k)\|, d_{j0}(k) = \|q_{j0}(k)\| \tag{1.3}$$

$$\varphi_0(k) = q_0(k+1) - q_0(k)$$

$$\varphi_{j0}(k) = q_{j0}(k+1) - q_{j0}(k) = \varphi_j(k) - \varphi_0(k) \tag{1.4}$$

constructing the parameter model based on the formulas (1.3) and (1.4):

$$\begin{cases} \grave{o}_s(k) &= \varphi_0(k)^T p_0(k) - \dfrac{1}{2}\left(d_0^2(k) - d_0^2(k-1) + \|\varphi_0(k)\|^2\right) \\[2mm] &= \varphi_0(k)^T\left(p_0(0) + \sum\limits_{i=1}^{k}\varphi_0(i)\right) - \dfrac{1}{2}\left(d_0^2(k) - d_0^2(k-1) + \|\varphi_0(k)\|^2\right) = \varphi_0(k)^T p_s(k) \\[3mm] \grave{o}_{j0}(k) &= \dfrac{1}{2}\left(d_{j0}^2(k) - d_{j0}^2(k-1) + \|\varphi_{j0}(k)\|^2\right) \\[2mm] &= \varphi_{j0}(k)^T q_{j0}(k) \end{cases} \tag{1.5}$$

ity control model, a controller for the UAV formation to pass through the obstacle, and controlling a flight velocity of the UAV formation through the controller to enable the UAV formation to pass through the frame-shaped obstacle;

wherein the constructing the UAV velocity control model comprises:

modeling each of the UAVs as a discrete-time integrator with bounded velocities by using the following formula:

$$\begin{cases} p_0(k+1) = p_0(k) + \bar{v}_0(k)T, \ \|\bar{v}_0(k)\| \le V_0 \\ p_j(k+1) = p_j(k) + \bar{v}_j(k)T, \ \|\bar{v}_j(k)\| \le V_j \end{cases} \tag{1.2}$$

wherein T is a sampling period, $P_0(k)$ and $P_j(k)$ respectively represent positions of a primary UAV and a UAV j in a global coordinate system at a moment k, $\bar{v}_0(k)$ and $\bar{v}_j(k)$ are velocity bounds to the primary UAV and the UAV j respectively, $V_0$ and $V_j$ are maximum velocities of the primary UAV and the UAV j respectively, and $V_j > V_0$.

wherein $P_0(0)$ represents a position of a primary UAV at an initial moment, $P_s(k)$ represents a position of the frame-shaped obstacle at a moment k, $p_0(k)$ represents a primary UAV at a moment k, $d_0(k)$ represents a distance between the primary UAV and the frame-shaped obstacle, $d_{j0}(k)$ represents a distance between the primary UAV and the a UAV j, $q_0(k)$ represents a relative position between the primary UAV and the frame-shaped obstacle, $q_{j0}(k)$ represents a relative position between the UAV j and the primary UAV, $\varphi_0(k)$ represents a displacement of the primary UAV, $\varphi_0(k)$ stated as representing a displacement of the primary UAV, $\varphi_j(k)$ represents a displacement of the UAV j, $\varphi_{j0}(k)$ represents a relative displacement between the primary UAV and the UAV j, $\grave{o}_s(k)$ is a constructed parameter model related to the position $p_s(k)$, $\grave{o}_{j0}(k)$ is a constructed parameter model related to the relative position $q_{j0}(k)$, and the superscript T represents transposition.

4. The method according to claim 1, wherein the controller for the UAV formation to pass through the obstacle is designed as follows:

$$\begin{cases} v_0(k) &= A_0\left(H_0(k) - p_0(0) - \sum_{i=0}^{k-1}\varphi_0(i) + \hat{p}_s(k) + \varsigma(k)\right), \\ \bar{v}_0(k) &= \dfrac{\min(V_0, \|v_0(k)\|)}{\|v_0(k)\|}v_0(k),\ V_0 > 0 \\ v_j(k) &= A_j\left(H_{j0}(k) - \hat{q}_{j0}(k)\right) \\ \bar{v}_j(k) &= \dfrac{\min(V_j, \|v_j(k)\|)}{\|v_j(k)\|}v_j(k),\ V_j > V_0 > 0 \end{cases}$$ (1.8)

wherein $P_0(0)$ represents a position of a primary UAV at an initial moment, $\hat{q}_{j0}(k)$ is an estimated position of a UAV j relative to a primary UAV, $\varphi_0(i)$ represents a displacement of the primary UAV at a moment i, $\hat{p}_s(k)$ is an estimation value of a position $p_s(k)$ of the frame-shaped obstacle at a moment k, $v_0(k)$ and $v_j(k)$ are velocities of the primary UAV and the UAV j obtained by event-triggering the controller for the formation to pass through the obstacle, $\bar{v}_0(k)$ and $\bar{v}_j(k)$ are obtained by limiting $v_0(k)$ and $v_j(k)$ to enable final output velocities to be less than preset maximum velocities $V_0$ and $V_j$, $A_0$ and $A_j$ are controller coefficients, and $\zeta(k)$ is a continuous excitation signal; and $H_0(k)$ and $H_{j0}(k)$ each is a switching function that is a segmented constant function, and $H_0(k)$ and $H_{j0}(k)$ represent signals switching between displaying formation and passing through the obstacle.

5. The method according to claim 4, wherein $H_0(k)$ and $H_{j0}(k)$ are specifically expressed as follows:

$$H_0(k) = \begin{cases} q_0^s & k \in [k_1, k_2] \\ Rot^*(\hat{q}_0(k) + \alpha) & k \in (k_2, k_3) \\ q_0^e & k \in [k_3, k_4] \end{cases}$$ (1.9)

$$H_{j0}(k) = \begin{cases} Rot^* q_{j0}^{pass} & k \in (k_2, k_3) \\ q_{j0}^{init} & k \in [k_1, k_2] \cup [k_3, k_4] \end{cases}$$

wherein $k_1$ is an initial time, $k_4$ is an operation time, $k_2 = \sup\{k > k_1 | \hat{q}_0(k) < q_0^s\}$, $k_3 = \sup\{k > k_3 | \hat{q}_0(k) > q_0^e\}$, $\hat{q}_0(k)$ represents an estimation value of a position of the primary UAV at the moment k, sup represents an upper bound, $q_0^s$ and $q_0^e$ are start and end points artificially set for an event trigger respectively, Rot is a rotation matrix of the frame-shaped obstacle relative to a coordinate system; in a two-dimensional case, the rotation matrix is:

$$Rot = \begin{pmatrix} \cos(w) & -\sin(w) \\ \sin(w) & \cos(w) \end{pmatrix},$$

w is an angle of the obstacle relative to the UAV in the coordinate system; $\alpha$ is a pass-through step during passing through the obstacle;

$$q_{j0}^{init}$$

is a formation of the UAVs before and after passing through the obstacle, and $$q_{j0}^{pass}$$

is a formation of the UAVs during passing through the obstacle.

6. A terminal device, comprising a memory, a processor, and a computer program stored in the memory and executable on the processor, wherein the processor executes the computer program to perform the steps of the method according claim 1.

7. A non-transitory computer-readable storage medium, wherein the computer-readable storage medium stores a computer program, and the steps of the method according claim 1 are performed when the computer program is executed by a processor.

* * * * *